Patented Dec. 14, 1948

2,455,949

UNITED STATES PATENT OFFICE 2,455,949

DIALKYLAMINOALKYL BENZHYDRYL ETHERS AND SALTS THEREOF

George Rieveschl, Jr., Grosse Pointe Woods, Mich., assignor to Parke, Davis & Company, Detroit, Mich., a corporation of Michigan No Drawing. Application June 2, 1947, Serial No. 751,985

7 Claims. (Cl. 260—570)

The invention relates to amino ethers and their acid addition salts. This application is a continuation-in-part of my copending application Serial No. 531,639, filed April 18, 1944, Patent No. 2,421,714 issued June 3, 1947, and relates to certain dialkylaminoalkyl benzhydryl ethers and their acid addition salts. The free bases of the dialkylaminoalkyl benzhydryl ethers of the invention have the formula,

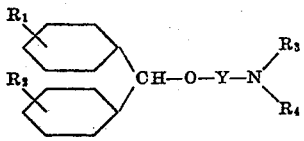

where Y is a branched chain alkylene radical containing 3 to 6 carbon atoms inclusive, $R_1$ and $R_2$ are the same or different and represent hydrogen, halogen, lower alkyl or lower alkoxy radicals and $R_3$ and $R_4$ are the same or different alkyl radicals containing not more than six carbon atoms.

The compounds of the present invention may be obtained as a free base having the formula given above or as acid addition salts of the base with inorganic or organic acids. Some examples of the salts which may be prepared by the methods hereinafter described are the hydrochloride, hydrobromide, hydroiodide, sulfate, phosphate, acetate, citrate, oxalate, succinate, benzoate, tartrate, phthalate, maleate, oleate and the like.

These new dialkylaminoalkyl benzhydryl ethers may be prepared by several different processes. For example, these compounds may be prepared by the condensation of a benzhydryl halide with a dialkylaminoalkanol. The condensation of these two reactants may be carried out by several different methods, i. e., it may be effected in the presence or absence of an acid-binding agent or with or without a solvent. Another method for preparing these compounds consists in reacting an alkali metal salt of benzhydrol with a dialkylaminoalkyl halide or, if desired, the reactants may be interchanged and an alkali metal salt of a dialkylaminoalkanol reacted with a benzhydryl halide. A further method of preparation consists in reacting an ω-halo alkyl benzhydryl ether with a dialkylamine.

The free bases and the acid addition salts of these particular benzhydryl ethers are, in addition to being useful as intermediates in the synthesis of other organic compounds, powerful antispasmodics and antihistamine agents.

The invention is illustrated by the following examples.

*Example 1.—β-Dimethylamino-α-methylethyl benzhydryl ether*

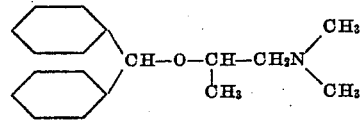

123 g. of benzhydryl bromide is added slowly to a refluxing solution of 103 g. of β-dimethylamino-isopropanol and the resulting mixture refluxed for twenty hours. The mixture is allowed to cool for about one-half hour and the viscous lower layer consisting of the hydrobromide salt of the amino alcohol drawn off. The upper layer is filtered and then added to hot solution of 63 g. of oxalic acid dihydrate in 200 cc. of isopropanol. The acid oxalate salt of the desired β-dimethylamino-α-methylethyl benzhydryl ether which separates on cooling is removed, washed with isopropanol and then with ether and finally dried; M. P. 159–61°. If desired, this salt may be purified by recrystallization from isopropanol. The pure salt melts at 162–3° C.

87.5 g. of the acid oxalate of β-dimethylamino-α-methylethyl benzhydryl ether is added to 400 cc. of water, treated with an excess of 10 N potassium hydroxide solution and the solution extracted with ether. The ether extracts are dried, the ether distilled and the residue distilled under reduced pressure to obtain the pure free base of β-dimethylamino-α-methylethyl benzhydryl ether; B. P. 122–3° C./0.5 mm. of Hg.

The hydrochloride salt of this compound may be prepared by dissolving 13.5 g. of the purified free base in 200 cc. of dry ether and adding an excess of isopropanolic hydrogen chloride. The white, fluffy hydrochloride salt which separates is collected and purified by recrystallization from isopropanol-ether mixture; M. P. 149–50° C.

*Example 2.—γ-Diisopropylamino-β-methylpropyl-3-chlorobenzhydryl ether*

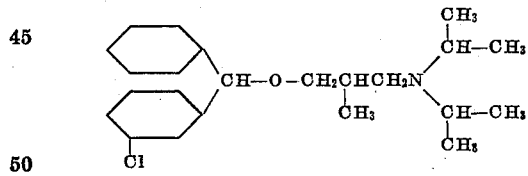

A mixture consisting of 2.4 g. of fine sodium wire and 18.3 g. of γ-diisopropylamino-β-methylisopropanol in 150 cc. of benzene is refluxed for ten hours, cooled and any undissolved sodium removed. 27.8 g. of 3-chlorobenzhydryl bromide is added slowly and the reaction mixture refluxed for ten hours, cooled and treated with 300 cc. of cold water. The organic layer is separated, extracted with dilute hydrochloric acid and the acidic extracts made alkaline. The alkaline mixture is extracted with ether, the ether extracts dried and the ether distilled. The excess amino alcohol present in the crude product is removed as completely as possible by distillation in high vacuo and the residue dissolved in ether. The ether solution containing the free base of the desired γ-diisopropylamino - β - methylpropyl - 3 - chlorobenzhydryl ether is treated with an excess of dry hydrogen bromide and the hydrobromide salt which separates, collected and purified by recrystallization from isopropanol-ether mixture.

*Example 3.—γ-Diethylamino-β,β-dimethylpropyl benzhydryl ether*

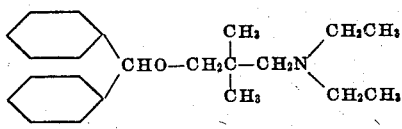

2.5 g. of fine sodium wire is added to 200 cc. of a benzene solution containing 18.4 g. of benzhydrol and the resulting mixture heated under reflux for ten hours. The undissolved sodium is removed and 18.5 g. of γ - diethylamino - β,β - dimethylpropyl chloride added. The reaction mixture is refluxed for eight hours, cooled and treated with 300 cc. of water. The organic layer is removed and extracted with dilute hydrochloric acid. The acidic extracts are made alkaline with 10 N sodium hydroxide solution, extracted with ether and the combined ether extract dried. The ether is distilled and the residue distilled in high vacuo to obtain the free base of the desired γ-diethylamino-β,β-dimethylpropyl benzhydryl ether.

If desired, acid addition salts of this compound can be prepared by dissolving the free base in dry ether and adding an ether or alcohol solution of the inorganic or organic acid corresponding to the salt desired.

*Example 4.—δ-Diethylamino-α-methylbutyl-4-methylbenzhydryl ether*

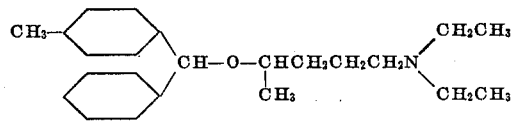

26.1 g. of 4-methylbenzhydryl bromide is added slowly to a refluxing solution of 45 g. of 1-diethylamino-4-pentanol in 150 cc. of xylene and the resulting mixture heated under reflux for about twenty hours. The mixture is cooled, diluted with water and the organic layer separated. The xylene and excess amino alcohol are distilled from the organic layer under reduced pressure and the residue added to a warm isopropanol solution containing one equivalent of oxalic acid dihydrate. The acid oxalate salt which separates upon cooling of the solution is removed, suspended in water and treated with an excess of potassium hydroxide solution. The alkaline mixture is extracted with ether, the ether extracts dried and the ether distilled to obtain the free base of the desired δ-diethylamino-α-methylbutyl-4-methylbenzhydryl ether.

10 g. of the above free base is dissolved in dry ether and the resulting solution treated with an excess of dry hydrogen chloride. The hydrochloride salt which separates is collected, washed with ether and crystallized from isopropanol-ether mixture.

*Example 5.—β-Di-n-butylamino-α-methylethyl-2,2'-dimethoxybenzhydryl ether*

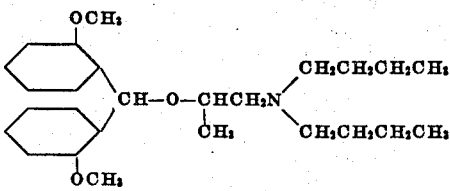

A mixture consisting of 10.6 g. of anhydrous sodium carbonate and 30 g. of β-di-n-butylamino-isopropanol is heated to about 125° C. and 30.7 g. of 2,2'-dimethoxybenzhydryl bromide added in small portions with stirring. After the addition has been completed the mixture is heated at 125° C. for about six hours, cooled and treated with about 300 cc. of water. The organic layer is diluted with ether, removed and extracted with dilute hydrochloric acid. The acidic extracts are made alkaline, extracted with ether and the ether and excess amino alcohol present in the crude product distilled off in vacuo. The residue is cooled, redissolved in ether and the solution treated with an excess of dry hydrogen bromide. The hydrobromide salt of β-di-n-butylamino-α-methylethyl - 2,2' - dimethoxybenzhydryl ether which separates, is collected and purified by recrystallization from isopropanol-ether mixture.

*Example 6.—β-Dimethylamino-α-ethylethyl benzhydryl ether*

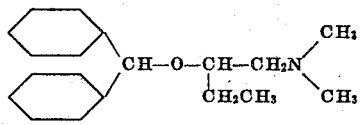

A solution consisting of 24.7 g. of benzhydryl bromide and 36 g. of 1-dimethylamino-2-butanol in 100 cc. of xylene is heated under reflux for about twenty hours, cooled and about 300 cc. of cold water added. The organic layer is separated and distilled in vacuo to obtain the free base of the desired β-dimethylamino-α-ethylethyl benzhydryl ether as a very light yellow colored oil.

15 g. of the free base prepared as above is dissolved in dry ether and an excess of isopropanolic hydrogen chloride added to the resulting solution. The white hydrochloride salt of β-dimethylamino-α-ethylethyl benzhydryl ether which separates is collected and purified by recrystallization from isopropanol-ether mixture.

Some further examples of the compounds of the invention which may be prepared by application of the above described methods are:

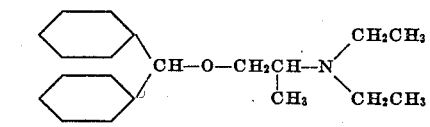

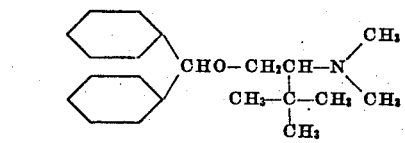

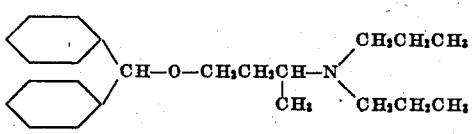

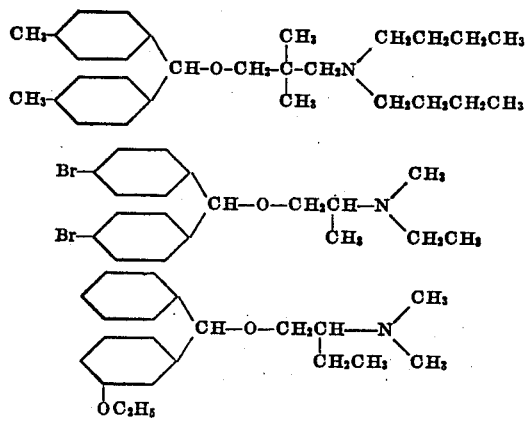

In its broader aspects the invention includes the quaternary ammonium, as well as the acid addition, salts of the free bases of the new dialkylaminoalkyl benzhydryl ethers. These quaternary ammonium salts are prepared by reacting an alkyl or aralkyl halide, a dialkyl sulfate or an alkyl aryl sulfonate with the free base of the benzhydryl ethers. The quaternary ammonium halides can also be prepared by the reaction of an ω-halo-alkyl benzhydryl ether compound with a trialkyl- or a dialkylaralkylamine.

Attention is called to copending applications, Serial Nos. 688,420, 688,421, 688,422 and 688,423, all filed August 5, 1946, and Serial No. 15,257, filed March 16, 1948, wherein certain processes adapted for the preparation of the compounds herein claimed are disclosed and claimed.

Attention is also called to the fact that compounds somewhat related to those claimed herein are described and claimed in my copending applications as follows: Serial No. 640,685, filed January 11, 1946; Serial No. 640,686, filed January 11, 1946; Serial No. 640,687, filed January 11, 1946; Serial No. 660,406, filed April 8, 1946; Serial No. 688,424, filed August 5, 1946; Serial No. 688,425, filed August 5, 1946; Serial No. 688,426, filed August 5, 1946; Serial No. 688,427, filed August 5, 1946; Serial No. 739,985, filed April 8, 1947; Serial No. 751,983, filed June 2, 1947; Serial No. 751,984, filed June 2, 1947; Serial No. 780,099, filed October 15, 1947; and Serial No. 33,432, filed June 16, 1948.

What I claim as my invention is:

1. A compound of the class consisting of a free base, its quaternary ammonium salts and its acid addition salts, said free base having the formula,

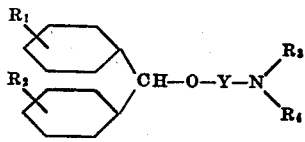

where Y is a branched chain alkylene radical containing 3 to 6 carbon atoms inclusive, $R_1$ and $R_2$ are members of the class consisting of hydrogen, halogen, lower alkyl and lower alkoxy and $R_3$ and $R_4$ are alkyl radicals containing not more than six carbon atoms.

2. A compound of the class consisting of a free base, its quaternary ammonium salts and its acid addition salts, said free base having the formula,

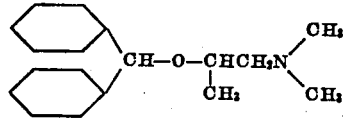

3. A compound of the class consisting of a free base, its quaternary ammonium salts and its acid addition salts, said free base having the formula,

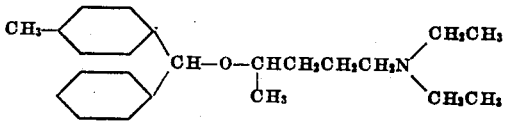

4. A compound of the class consisting of a free base, its quaternary ammonium salts and its acid addition salts, said free base having the formula,

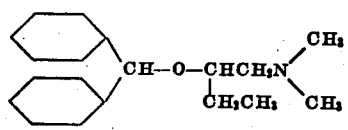

5. A compound of the formula,

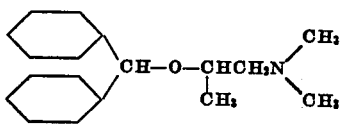

6. A compound of the formula,

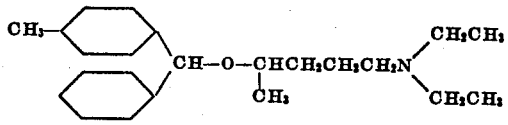

7. A compound of the formula,

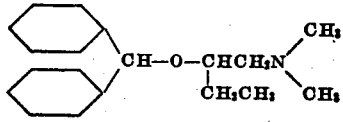

GEORGE RIEVESCHL, JR.

No references.